United States Patent [19]

Condon

[11] 3,855,537

[45] Dec. 17, 1974

[54] BAND-SEPARATION FILTER WITH REDUCED PATH CROSS-CONNECTIONS

[75] Inventor: Joseph Henry Condon, Summit, N.J.

[73] Assignee: Bell Telephone Laboratories Incorporated, Murray Hill, N.J.

[22] Filed: Aug. 9, 1973

[21] Appl. No.: 387,126

[52] U.S. Cl. .................................. 328/167, 330/126

[51] Int. Cl. .............................................. H03b 1/04

[58] Field of Search ....... 330/109, 84, 126; 328/167

[56] References Cited

UNITED STATES PATENTS

| | | | |
|---|---|---|---|
| 3,112,452 | 11/1963 | Kirkpatrick | 328/167 |
| 3,370,247 | 2/1968 | Hoffman et al. | 330/109 |
| 3,421,141 | 1/1969 | Meyerhoff | 328/167 X |
| 3,611,165 | 10/1971 | Hills | 328/167 |
| 3,727,147 | 4/1973 | DeWitt | 330/84 |

*Primary Examiner*—John S. Heyman

*Attorney, Agent, or Firm*—C. S. Phelan

[57] ABSTRACT

Plural bandpass filter units in a band-separation filter (BSF) are supplied with a common input signal and have passband characteristics for dividing that signal into different predetermined frequency bands on respective circuits. Frequency selective degenerative feedback is employed within each filter branch circuit, in combination with broadband degenerative feedback from all branch circuit outputs to the common input, for suppressing in each branch the signal effects corresponding to frequency bands of other branches.

In addition, the degenerated common input signal has a multinotch frequency spectrum with a notch at each branch frequency. A first BSF is used in the multinotch mode to block, e.g., telephone dial tone frequencies and thereby facilitate the operation of a tandem second BSF operating in the BSF mode to select pushbutton dialing frequencies.

10 Claims, 2 Drawing Figures

BAND-SEPARATION FILTER WITH REDUCED PATH CROSS-CONNECTIONS

BACKGROUND OF THE INVENTION

1. Field of the Invention

This invention relates to band-separation filters; and it relates, in particular, to feedback arrangements for such filters.

2. Description of the Prior Art

Band-separation filters sometimes employ path cross-connections for suppressing, in each path, frequency components that are more properly transmitted in another path of the filter. Such cross-connections are not accurately considered to be feedback connections because they extend to inputs of circuits that do not directly participate in the production of the cross-connected signal. Respective filter path outputs are enhanced by the above-mentioned cross-connection circuit effects in a way that is sometimes said to resemble the operation of the eye of a crab. Hence, that type of band-separation filter is sometimes called a carb's eye filter.

Analog signal combining impedances for coupling cross-connection outputs to branch filter unit inputs represent a significant part of the multipath filter cost. In addition, the wiring for cross coupling connections involves many lead crossovers, i.e., integrated circuit arrangements which permit one lead to cross over another lead without electrically contacting the latter lead. In prior crab's eye filters the output of each branch was cross-connected to the input of all other branches but not fed back to its own input, and that necessarily required many crossovers among cross-connections. Both the input signal combining impedance problem and the lead crossover problem become increasingly serious as the number of filter branches increases. At least seven branches are required for current telephone pushbutton dialing tone detection arrangements. Signal feedback techniques have not heretofore been employed in these arrangements for realizing the so-called crab's eye function because the branch outputs are to be enhanced in their own branches and suppressed in other branches; and simple feedback connections heretofore provided in the art do not lend themsleves readily to causing such diverse effects.

An M. T. Hills article entitled "Crab's-Eye Filter — Novel Synthesis Procedure for Sets of Band-separation Filters, " *Proc. IEE*, *Vol.* 119, No. 6, June 1972, pages 641–648, discusses the origin of the name "crab's eye filter and is illustrative of prior efforts to reduce band-separation filter cost in terms of impedance tolerances and numbers. However, those efforts involved the use of cross-connections from each filter path output to inputs of all other parts and the use of analog adders in path inputs to combine a main input with cross-coupled inputs. Each adder typically includes a series resistor for each adder input. Thus, for an N-path filter, there are n adders, $N^2$ input resisotrs, and N(N-1) cross-coupling lead extending in different directions along nonparallel lines that must cross over each other as well as the various branch circuits. As the valaue of N increases, e.g., to seven for a telephone pushbutton dialing signal receiver, the handling of the resistors and cross-connections becomes awkward, especially for integrated circuit systems where the added resistors, connections, and lead crossovers add significantly to manufacturing costs.

STATEMENT OF THE INVENTION

The foregoing problems of implementing band-separation filters are alleviated, in accordance with an illustrative embodiment of the present invention, in which each branch signal path of a band-separation filter is provided with its own frequency selective degenerative feedback connection around its branch filter unit for suppressing all but one frequency and thereby enhancing the production in that branch of primarily only that one of the desired frequency bands. In addition, outputs from all of the branch filter units are degeneratively applied to the common input connection of the band-separation filter.

It is one feature of the invention that substantially fewer signal combining impedances and fewer lead crossovers are required for the same number of band-separation filter branches where more than two such branches are employed.

It is another feature that individual path degenerative feedback paths do not cross over each other or over the filter paths of other branches. Similarly, the degenerative paths to the common input extend along paths that do not intersect one another and need cross none of the filter branch paths in an N-branch filter.

A further feature is that the degenerated common input has a multinotch band rejection characteristic that is independently useful individually or in combination with other filters.

BRIEF DESCRIPTION OF THE DRAWING

A more complete understanding of the invention and the various features, objects, and advantages thereof may be obtained from a consideration of the following detailed description in connection with the appended claims and the attached drawing in which:

DETAILED DESCRIPTION

Figure 1:
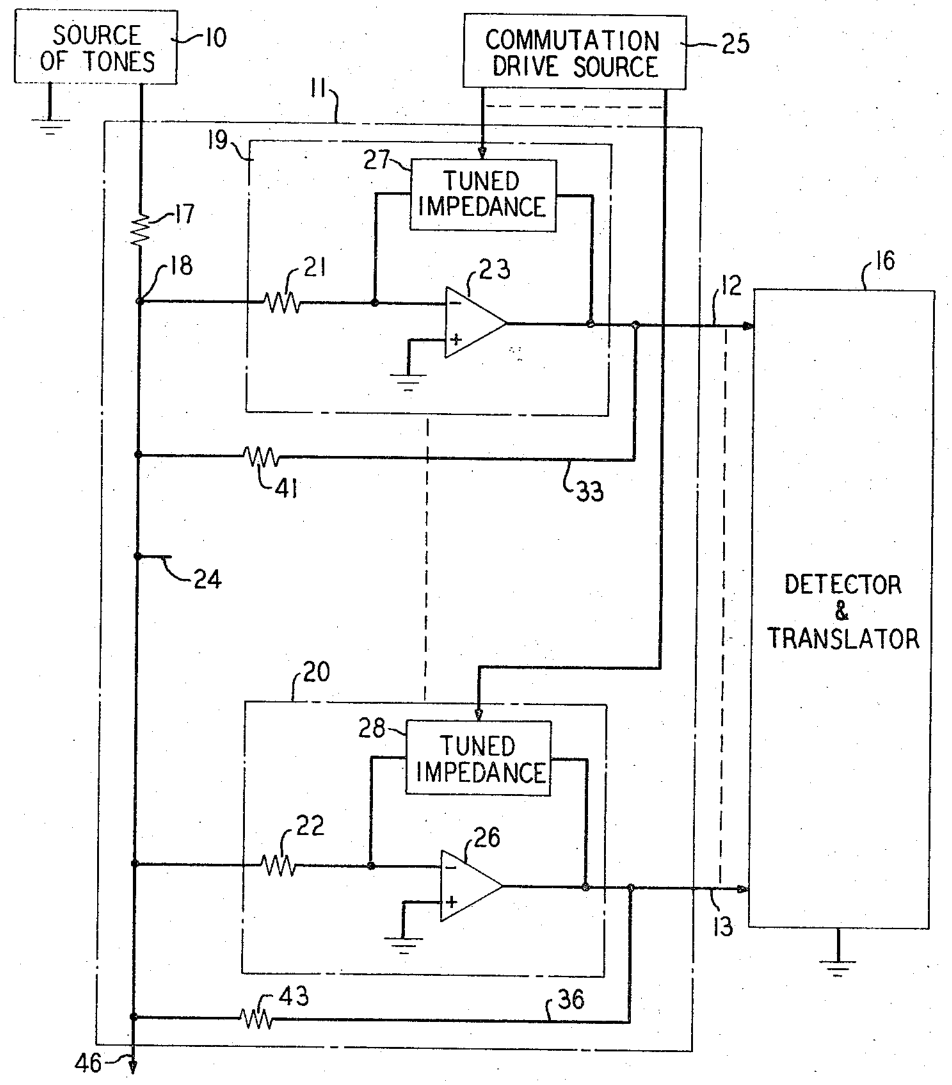
FIG. 1 is a simplified schematic diagram of a telephone, pushbutton dialing systems, band-separation receiver including the invention.

The invention is described in terms of a telephone system application. Utility of the invention is, of course, not so limited.

In the drawing a source 10 of pushbutton dailaing signals, or tones, provides such signals to a band-separation filter 11 in accordance with the present invention. Such signals usually comprise at any given time one pair of a plurality of pairs of frequencies, each pair indicating that a particular pushbutton of a telephone pushbutton dialing arrangement (not shown) has been actuated. In addition, dial-tone signals indicating that a subscriber circuit is ready to receive dialing signals are often temporarily present. Thus, the source 10 schematically represents a plurality of telephone system subscriber stations which include pushbutton dialing arrangements. Source 10 further schematically represents subscriber lines to a central office including equipment for receiving such multifrequency dialing signals and directing them to circuit arrangements, such as are shown in the drawing, for detecting the particular pair of frequencies being received. Such detection is needed in order to identiffy the particular pushbutton that was actuated by a subscriber.

Band-separation filter 11 includes a plurality of output circuits, such as the two circuits 12 and 13 specifically shown in the drawing; and one such output circuit is provided for each of the possible frequencies that may be included in the incoming dialing signal frequency pairs. Output circuits of the filter 11 are applied to a pushbutton signal detector and translator 16 wherein the presence of a particular frequency component in a branch, with a component amplitude in excess of a predetermined threshold level, is detected; and the combination of frequencies thus detected at any single given time is translated to identify the particular pushbutton actuated by a dialing subscriber. Circuits represented by the source 10 and by the detector and translator 16 are well known in the art and comprise no part of the present invention.

Input signals from source 10 to the band-separation filter 11 are supplied through a resistor 17 to a signal summing node 18 from which the sijgnals are applied to a plurality of branch circuits, such as circuits 19 and 20, of the band-separation filter. Additional similar branch circuits are schematically represented by an intermediate branching lead 24 that is also connected to node 18. Circuits 19 and 20 each effect selection of a different band of frequencies from signals at node 18, and the circuits include series current limiting resistors 21 and 22, respectively. Each of the resistors 21 and 22 applies the input signal to an inverting input connection of a different operational amplifier, such as the amplifiers 23 and 26 for the branch circuits 19 and 20, respectively. Those amplifiers have their noninverting input connections connected to the same ground reference that is utilized for the source 10 and the detector and translator 16. A negative feedback path is provided from each amplifier output to its own inverting input connection, and each such feedback path includes an impedance arrangement which provides minimum degenerative feedback at a particular frequency in the center of the frequency band which is to be selected by that particular branch circuit. For example, the impedances 27 and 28 are illustrated for providing the indicated feedback for amplifiers 23 and 26, respectively. In one form, these impedances are advantageously parallel resonant circuits tuned to the respecstive branch selection frequencies, and which provide, as is well known in the art, a minimum current as the resonant frequency. Alternatively, the impedances 27 and 28 advantageously comprise commutatable capacitor impedance devices connected for producing the same feedback effects just outlined, and supplied with commutation drive signals at a multiple of the respective center frequencies from signal sources in the aforementioned central office as schematically represented by a commutation drive source 25 in the drawing. Those drive signals control capacitor commutation in each of the units at the frequency of the center of the passband for such unit. Control leads from source 25 are advantageously extended to the tuned feedback impedances without crossing the corresponding feedback circuits. Commutatable capacitor units of the aforementioned type are disclosed in my U.S. Pat. No. 3,729,695, the disclosures of which patent are hereby incorporated herein by reference. hereby incorporated herein by reference.

In a typical pushbutton dialing signal receiving application, the branch circuit 19 would, for example, select the highest frequency in a three-frequency high frequency group of pushbutton dialing signals; and thus the impedance 27 would be tuned to 1,477 hertz. Similarly, branch circuit 20 would select, for example, the lowest frequency in the low frequency group of pushbutton dialing signals; and the impedance 28 would be tuned to 697 hertz.

Amplifiers such as the amplifiers 23 and 26 have a theoretical infinite gain; but when combined with appropriate feedback impedances, such as the impedances 27 and 28, respectively, they provide very high gain from the summing node 18 to the respective branch output circuits 12 and 13 at the frequency of the selectively tuned degenerative feedback of the type described.

Outputs of the amplifiers 23 and 26 are extended by the output circuits 12 and 13 for application to the detector and translator 16. In addition the same amplifier outputs are degeneratively coupled to the summing node 18. Each output is so coupled by a different circuit, e.g., circuits 33 and 36, and by a series resistor, e.g., resistors 41–43. Each of the latter feedback circuits and its associated resistor is advantageously routed adjacent to its own branch circuit so that it need not cross over either other feedback circuits or other brand circuits. Due to the phase inversion in the amplifiers 23 and 26, the feedback by way of circuits 33 and 36 is degenerative with respect to the input signals which are also applied to node 18 from the source 10. Thus, it can be said that a degenerated common input signal appears at node 18.

In view of the high gain achieved through each of the filter branch circuits, and in view of the degenerative feedback through circuits 33 and 36, the signal frequency spectrum summing node 18 includes frequency notches of essentially zero signal at frequencies corresponding to each of the pushbutton dialing signal frequencies which can be selected by the branch circuits 19 and 20 of the band-separation filter 11. That multinotch spectrum is applied to a lead 46 for a purpose which will be described. However, insofar as the branch circuits are concerned, both ends of their respective branch series resistors are at a virtual ground for the branch frequency when that frequency is supplied from source 10. If branch amplifier output should start to fall off due to branch losses, the branch input from node 18 increases. If the fall off is due to reduction of the branch frequency output from source 10, the branch output suffers a similar reduction. Thus, the filter 11 in the drawing produces on its different outputs selected frequency signals corresponding to pushbutton dialing frequencies supplied from the source 10.

In achieving the aforementioned results, it is to be observed, however, that for a filter having N branch circuits there are N+1 signal combining resistors supplying signal to node 18 and an additional N resistors in the respective branch circuits as represented by the resistors 21 and 22. Thus, the total number of signal combining resistors required is 2N+1. This is to be contrasted with prior art arrangements employing cross-connections wherein each of the N filter branches requires an analog adder at the input thereof, and each such adder must have N input resistors. Consequently, such prior art circuits require $N^2$ signal combining resistors — a disadvantage that becomes increasingly significant as N increases beyond the value of two. Considering a typical present pushbutton dialing arrangement with seven dialing frequencies, the prior art circuits require 49 signal combining resistors, while the illustrative embodiment presented herein requires only 15 such resistors. Differences such as these are of considerable importance when considering integrated circuit arrangements.

Considering numbers of leads and lead crossovers with respect to feedback circuits and filter branch circuits, it will be seen that there are significant advantages in that aspect also. The illustrative embodiment includes N amplifier degenerative feedback circuits, e.g., 27 and 28, and N branch degenerative feedback circuits, e.g., 33 and 36, to node 18 for an N-branch filter. A prior art N-branch filter using cross-connections requires N(N-1) cross-connections. Furthermore, those more numerous cross-connections extend along differently directed paths that must cross each other as well as crossing the branch circuits. On the other hand, the feedback circuits of the present invention do not cross one another and do not cross branch circuits.

Figure 2:
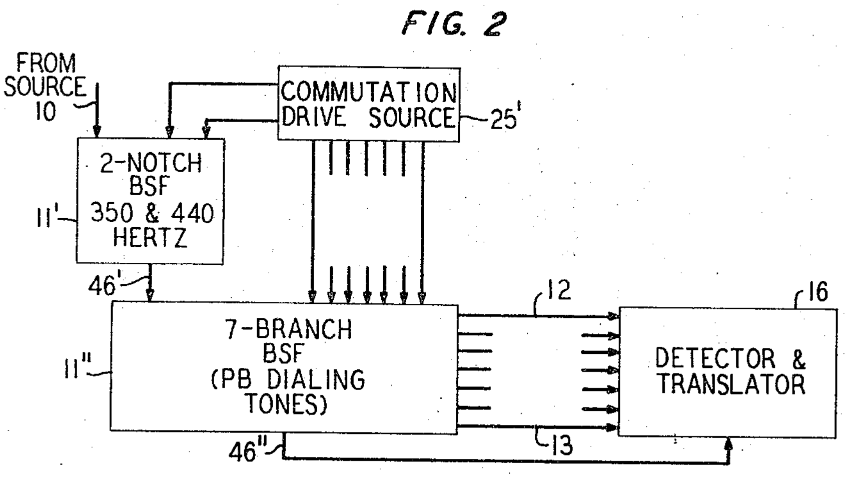
FIG. 2 is a block and line diagram of a modified receiver utilizing tandem connected filters of the invention.

It is often handy to have a multinotch band rejection filter, and such arrangements usually require a completely separate design problem as distinguished from band-separation filters. However, in accordance with one aspect of the present invention, a single filter structure such as filter 11 in FIG. 1 provides both band-separation signals at output circuits 12 and 13 and multinotch band rejection signals at output lead 46. This feature is utilized to advantage in, for example, a telephone cental office where circuits that receive for detection pushbutton dialing signals may also at certain times have dial-tone signals present. Since the dial-tone frequencies may cause spurious operation of the pushbutton dialing signal detection, it is advantageous to be able to reject the former conveniently. The diagram of FIG. 2 illustrates one way to achieve that result. In that Figure, circuit elements correspnoding to those in FIG. 1 are indicated by the same, or similar, reference characters as those used in FIG. 1.

In FIG. 2, a first band-separation filter 11' receives the signals from source 10. Filter 11' is of the same type as filter 11 but has only two branches, and they are tuned to 350 hertz and 440 hertz, respectively, the dial-tone frequencies usually used in a telephone office. Source 25' supplies the necessary commutation drive signals for commutatable capacitor units. Output lead 46' couples the filter multinotch output, with notches at the dial-tone frequencies, to another filter 11'' that also receives commutation drive from source 25'. Filter 11'' has seven branches tuned to select the seven pushbutton dialing frequencies for application to detector and translator 16. In addition, a seven-notch band rejection output is available on lead 46''. If a signal is present on lead 46'', the tone from source 10 could not be a valid pushbutton dialing signal; and its presence is used to disable detector and translator 16. Thus, the dial-tone is rejected by filter 11' before the output of source 10 is applied to filter 11'' and the detector and translator is protected from spurious operation. However, the same basic type of filter design is utilized in both of filters 11 and 11''.

Although the present invention has been described in connection with a particular embodiment thereof, it is to be understood that additional embodiments and applications which will be obvious to those skilled in the art are included within the spirit and scope of the invention.

What is claimed is:

1. An electrical frequency filter apparatus comprising a plurality of bandpass frequency filter units covering different frequency bands and connected to be fed electrical signals from a common input connection, means, in each filter unit, for degeneratively feeding back an output of such unit to an input thereof for all but a different one of said bands, and means for degeneratively feeding back outputs of all of said units back to said common input connection to effect substantially complete cancellation of said different bands in such input for producing a degenerated input.

2. The filter apparatus in accordance with claim 1 in which each filter unit comprises a series signal transmission path, an operational amplifier connected in series in said path, and a circuit tuned for minimum current transmission at the center frequency of the filter unit passband and connected between the amplifier output and an input of the amplifier in the unit series signal path.

3. The filter apparatus in accordance with claim 1 wherein each filter unit comprises an operational amplifier, a commutatable capacitor impedance unit connected between an output of the amplifier and an inverting input thereof, and means for supplying to said commutatable capacitor unit a drive signal for controlling capacitor commutation therein at the frequency of the center of the passband for such unit.

4. The filter in accordance with claim 1 in which said degenerative feedback means to said common input connection comprise leads extending along nonintersecting paths from respective outputs of said units to said common input connection, each of said leads having a bandpass response including all of said bands.

5. The filter in accordance with claim 4 in which said filter is a substantially planar circuit array, each of said filter units connected to said common input connection comprises a different filter branch circuit, and said lead paths further lack intersections with said branch circuits.

6. The filter in accordance with claim 1 in which said degenerative feedback means to said common input connection comprises an electrical circuit summing node, connections thereto from said common input and from an output of each of said filter units, and connections from said node to inputs of each of said filter units, and an output connection is provided from said node for presenting a node signal having an multinotch band rejection frequency spectrum characteristic, notches of said characteristic being at said different frequecy bands.

7. The filter in accordance with claim 6 in which said filter units, degenerative feedback means, and node output connection comprise a first filter, a second filter is provided which also includes a common input connection, plural filter units and degenerative feedback means therefor connected as aforesaid for said first filter, means are provided for connecting said node output connection of said first filter to said common input connection of said second filter, and filter units of said first and second filters are all tuned to different frequencies.

8. The filter in accordance with claim 7 in which said degenerative feedback means of each filter unit comprises a different commutatable capacitor impedance unit, and means are provided for applying to each of said impedance units a drive signal for controlling capacitor commutation therein at a frequency of the passband for such unit.

9. The filter in accordance with claim 7 in which utilization means, responsive to outputs of said units of said second filter, are provided, and means are provided for inhibiting operation of said utilization means in response to signals at said common input connection of said second filter.

10. In a multiple frequency band-separation filter incorporating a plurality of active bandpass filters each connected between a common input node and a different output node, the improvement comprising:

a plurality of electrical circuits each connecting a different output node to said common input node and providing degenerative feedback thereto, said circuits including no elements in common with any of said bandpass filters.

* * * * *